Figure 1:
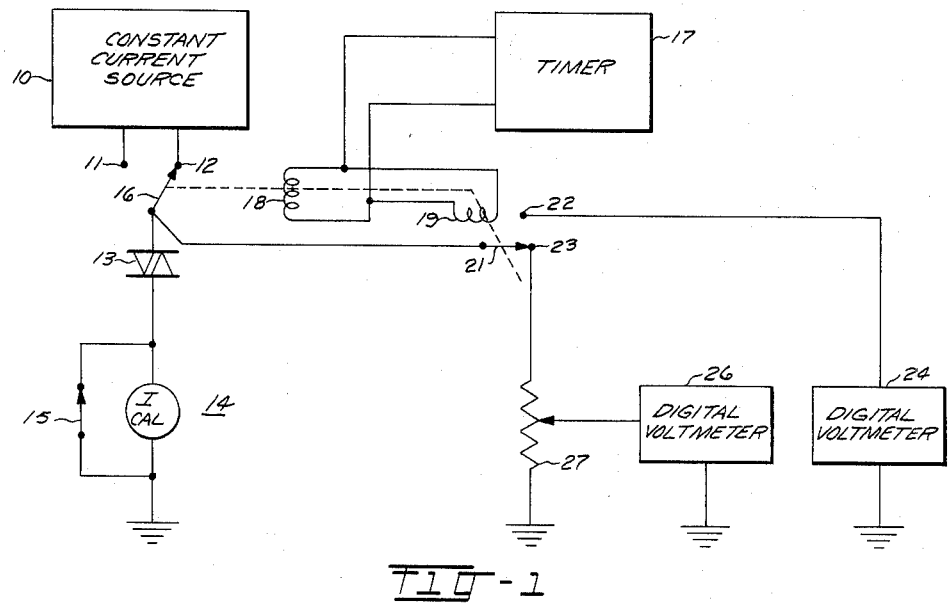

Oct. 12, 1965  H. D. MARSHALL  3,212,001
ELECTRICAL CIRCUIT FOR TESTING THE CURRENT-VOLTAGE
RELATIONSHIP OF ELECTRICAL DEVICES
Filed Aug. 30, 1961

INVENTOR
H. D. MARSHALL
By A. J. Nugent
ATTORNEY

United States Patent Office 3,212,001
Patented Oct. 12, 1965

3,212,001
ELECTRICAL CIRCUIT FOR TESTING THE CURRENT-VOLTAGE RELATIONSHIP OF ELECTRICAL DEVICES
Howard D. Marshall, Stroudsburg, Pa., assignor to Western Electric Company, Incorporated, a corporation of New York
Filed Aug. 30, 1961, Ser. No. 134,987
4 Claims. (Cl. 324—62)

This invention relates to a circuit for electrical testing, particularly for testing the current-voltage relationship of electrical devices under different operating conditions.

It is essential that prior to the installation of electrical devices, such as varistors, in a circuit, it be determined that they will perform satisfactorily under operating conditions. In the present case, it is required that under different current conditions the voltage across a varistor be within certain predetermined limits.

An object of the invention is to provide a simple and reliable testing circuit for automatically determining the current-voltage relationship of electrical devices under at least two operating conditions.

A more specific object of the invention is to provide a testing circuit for measuring the voltage across a varistor under different current conditions.

In practising the invention, a varistor to be tested is placed in a circuit calibrated to supply currents of two different precise magnitudes. Thereafter, the varistor is switched back and forth repetitively between the two current supplies. As one current supply is connected to the varistor, a first voltmeter is simultaneously placed across the varistor to provide a first voltage reading. As the other current supply is connected to the varistor, a second voltmeter is simultaneously placed across the varistor to provide a second voltage reading. One of the voltage readings is a proportionate one definitive of the required ratio of the voltage readings across the varistor under the respective operating current conditions.

Figure 2:
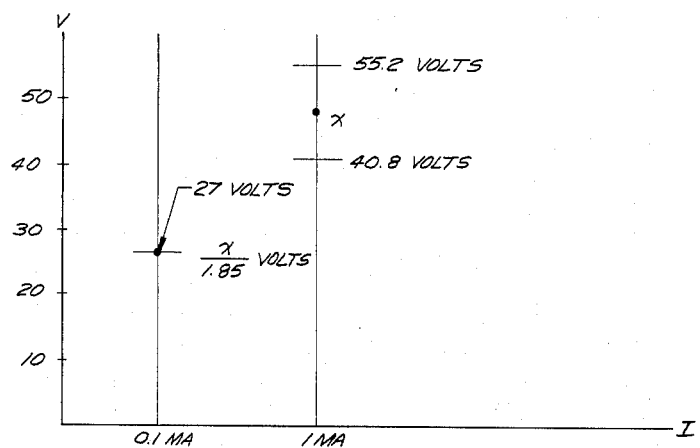

The invention will be better understood by reference to the drawing, wherein:

FIG. 1 is a schematic circuit diagram of a test set in accordance with the invention, and FIG. 2 is a graph illustrating the desired operating conditions.

In FIG. 1 a constant current source 10 is provided with outputs 11 and 12 for respectively providing 0.1 ma. and 1.0 ma. of current for the varistor 13 under test. A calibrating circuit 14 including a switch 15 is utilized to provide the precise desired currents before a series of tests is made. A switch 16 is used to alternately connect the varistor to the current outputs 11 and 12.

After the calibration has been made, switch 15 is closed. A timer 17 energizes coils 18 and 19 to simultaneously operate switches 16 and 21, switch 21 moving between the upper contact 22 and the lower contact 23. With switch 21 connected to upper contact 22 and switch 16 simultaneously connected to the output 11, the digital voltmeter 24 is placed across the varistor 13 under test, whereas when the switch 21 is connected to lower contact 23 and the switch 16 is connected to the output 12 (as shown in FIG. 1), a digital voltmeter 26 is placed across the varistor 13 under test. The digital voltmeters maintain their readings during the rapid switching. In one series of tests, the timer operated the switches at the rate of five cycles per second.

In order to determine that the proper voltage ratio exists for the varistor under test for the two operating current conditions, the input of the digital voltmeter 26 is provided with a voltage divider 27. The point at which the voltage divider 27 is tapped determines the tolerance ratio between the voltages under the two operating conditions. When the voltage read by the voltmeter 26 is equal to or less than the voltage read by the voltmeter 24, the varistor under test is acceptable. In one particular varistor tested, it was required that with 1.0 ma. passing through the varistor, the voltage across the varistor be between 40.8 and 55.2 volts, and the voltage ratio needed to pass 1.0 ma. to the voltage necessary to pass 0.1 ma. was required to be 1.85 maximum. This is illustrated in FIG. 2 where in one particular test the voltage needed to pass 1.0 ma. was approximately 50 volts, and hence the minimum acceptable voltage was approximately $50/1.85$ volts or 27 volts. Thus, a reading of 26 volts on digital voltmeter 24 would cause a rejection of the varistor under test. It should be noted that the actual voltage due to the 1.0 ma. current is the voltage recorded on meter 26 x 1.85, whereas the actual voltage due to the 0.1 ma. current is read on the voltmeter 24.

While the invention is described in connection with a non-linear device, such as a varistor, its use may be extended to the testing of other electrical devices or components.

Various changes may be made without departing from the spirit of the invention. For instance, it is conceivable that the timer 17 may be replaced by a manually operable switch. By using a voltage multiplier type of circuit instead of a voltage divider, the voltage reading process herein used could be reversed.

What is claimed is:

1. A circuit for testing the current-voltage relationship of electrical devices, wherein a device satisfies a prescribed test when a ratio of voltages equal to or less than a predetermined maximum ratio of voltages is established across the device for two known constant currents of different magnitudes, comprising:
   first and second current supplies,
   first and second voltmeters,
   means connected to the input of one of the voltmeters for reducing a voltage applied to that voltmeter by a factor proportional to the predetermined maximum ratio of voltages for the two known currents, and
   switching means for alternately connecting the first and second current supplies to the device under test and for simultaneously and alternately connecting the first and second voltmeters respectively across the device, one of the voltmeters being connected through the voltage reducing means.

2. A circuit according to claim 1 wherein the voltage reducing means connected to the input of one of the voltmeters is a voltage divider.

3. A circuit according to claim 1 wherein the switching means includes a timer.

4. A circuit according to claim 1, wherein the first and second voltmeters are constructed to provide digital readings, and the rate of switching the first and second current supplies to and the voltmeters across the test device is such that the readings are maintained on both of the voltmeters for simultaneous observation thereof.

References Cited by the Examiner
UNITED STATES PATENTS
2,934,705  4/60  Stetzler _____ 324—158

OTHER REFERENCES
"Diode Drift Tester," IBM Technical Disclosure Bulletin, volume 2, No. 6, April 1960, page 66.

WALTER L. CARLSON, *Primary Examiner.*